UNITED STATES PATENT OFFICE 2,625,502

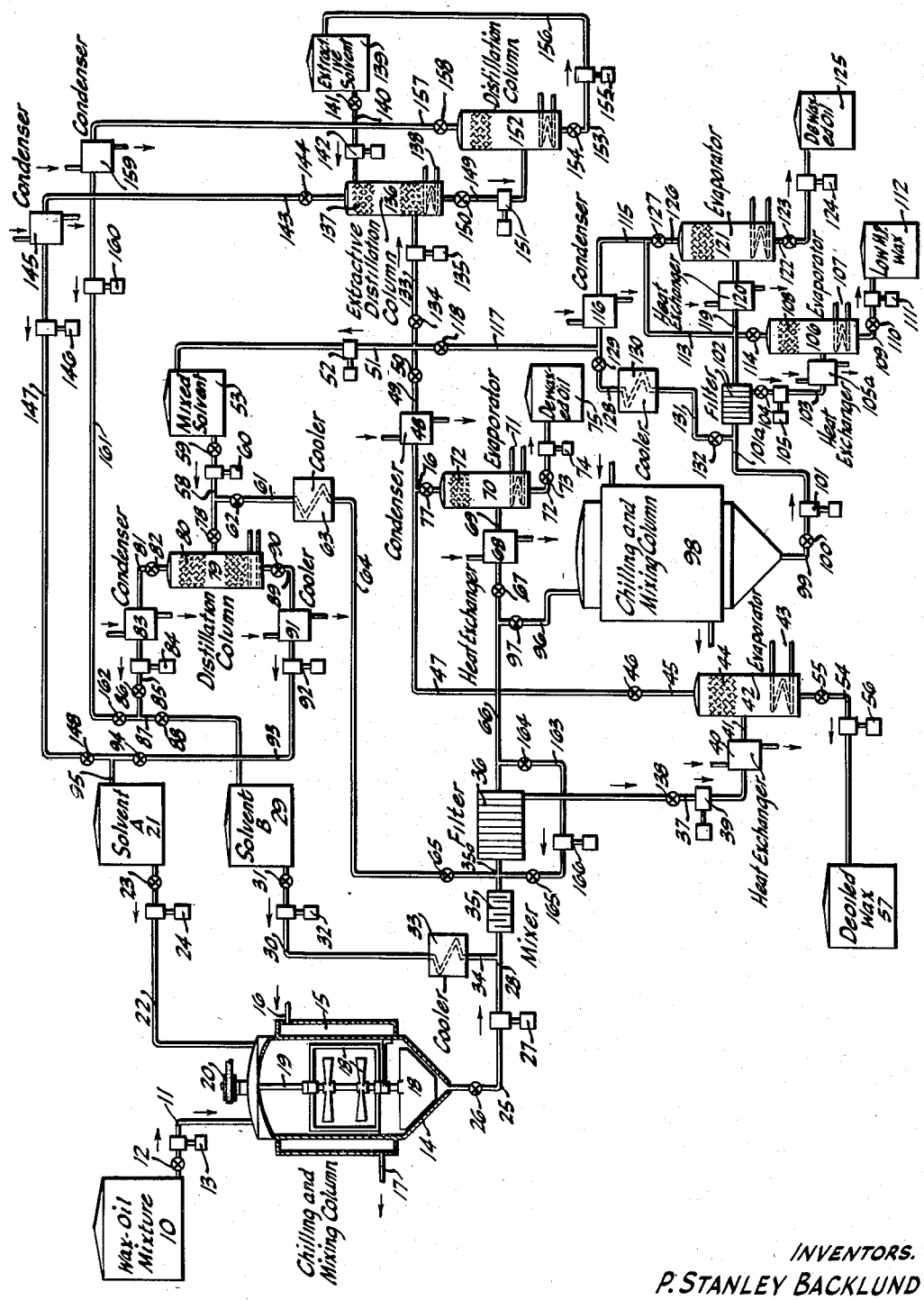

WAX-OIL SEPARATION

Peter Stanley Backlund, Long Beach, and Vance N. Jenkins, Palos Verdes Estates, Calif., assignors to Union Oil Company of California, Los Angeles, Calif., a corporation of California Application July 24, 1948, Serial No. 40,475

18 Claims. (Cl. 196—17)

This invention relates to the separation of oil and wax from wax-oil mixtures such as waxy oils, particularly waxy distillates or waxy raffinates, or from oily waxes such as slack waxes and the like. The invention relates particularly to a process for separating wax and oil from wax-oil mixtures to produce low pour test lubricating oils and oil-free waxes. The invention also relates to processes for treating wax-oil mixtures to produce high melting point waxes.

In conventional processes for separating wax from oil, the wax-oil mixture is chilled to a temperature sufficiently low to crystallize the wax contained in the oil. The precipitated wax is then separated from the oil by filtration. This type of operation is limited to oils of very low viscosity and by this method of operation it is generally impossible to produce oils having a pour test lower than about 35° F. Moreover, the wax cake which is separated may contain as much as 70% or more of oil.

In dewaxing more viscous oils it has been known to dilute the wax-oil mixture with solvents such as naphtha, benzene, toluene and like solvents, however using such solvents has never been satisfactory because of the low settling rates and/or long filtering times necessary to separate wax from such solutions. Moreover, waxes separated using solvents of this type contain large proportions of oil and are not washable on the filter.

Improved wax-oil separations are obtained by diluting the wax-oil mixtures with oxygenated or chlorinated solvents alone or together with naphthas, benzene, toluene and the like. Thus acetone, methyl ethyl ketone, methyl isobutyl ketone, isopropyl alcohol, butyl alcohol, ethylene dichloride and the like solvents may be used alone or in admixture with benzene, toluene, naphtha and the like. In practice, the solvent is added to the wax-oil mixture and the resulting solution cooled to cause rejection of wax, after which the separated wax is removed by filtration. Wax precipitated from solvents consisting of or containing the oxygenated or chlorinated solvents is superior in filtration characteristics to that separated from naphtha, benzene or toluene but it is still in such form that on filtration the wax cake is very voluminous and porous. This leads to rapid filtration but the cake retains a large amount of solvent and dissolved oil and it washes poorly due to the tendency of such cakes to crack with the resultant channeling of the wash solvent. Such wax cakes have been found to contain 60% or more of oil. The weight of solvent present in the so-called dry cake is usually two to four times that of the wax present.

A modification of the process involving dewaxing with solvents is described in U. S. Patent No. 2,229,658 to Jenkins. This patent discloses cooling the wax-oil mixture in the substantial absence of solvent and then adding the required amount of solvent or diluent immediately before filtering, or cooling the wax-oil mixture and adding solvent in increments during the cooling process.

It is generally considered that wax separates from oil, i. e. from oil with which it is normally associated, in a substantially oil-free crystalline form which would be readily filterable if the oil was sufficiently non-viscous at the filtering temperature to permit filtration. The object of using solvents has been to dilute the oil from which the wax separates or has separated in order to reduce its viscosity sufficiently to permit filtration. Although, as mentioned above, naphthas, benzene and toluene have been employed as solvents it is generally conceded that waxes do separate from oil-wax mixtures diluted with these solvents, particularly the aromatic solvents, in a modified form which is not readily filterable. In fact, such solvents employed alone have not found commercial utilization. In selecting solvents it is desirable that single solvents, or mixture of solvents, be employed which do not materially change the type of structure of the wax as it separates from the oil or oil-wax mixture, or at least do not modify the structure in such a way or to such an extent as to prevent easy filtration.

The oxygenated or chlorinated solvents mentioned above meet these requirements at least to a certain degree. However, in certain operations, particularly where low dewaxing or deoiling temperatures are employed, the oxygenated or chlorinated solvents do not have sufficient solvency for the oil present to prevent phase separation at the extremely low temperatures. In such cases sufficient good oil solvent such as naphtha, benzene or the like is added to the oxygenated or chlorinated solvent to prevent such phase separation. In general, commercial dewaxing and deoiling processes are based on the use of mixed solvents such as mixtures of benzene and methyl ethyl ketone. In such cases the methyl ethyl ketone is considered the wax anti-solvent and the amount of benzene employed is insufficient to seriously alter the wax anti-solvent properties of this ketone.

In all of the above processes it is essential that chilling rates be closely controlled. Too rapid chilling rates result in poorly crystallized waxes and bulky wax cakes which crack badly and wash unevenly.

It has now been discovered that improved wax-oil separations can be effected by chilling wax-oil mixtures in the presence of an aromatic solvent which modifies the type of structure of wax normally separating from such wax-oil mixtures, producing a gelatinous mixture of oil, solvent and wax, which gelatinous mixture is relatively stable and substantially unfilterable in that extremely long filtration times are required and the wax cake which is formed contains extremely high proportions of oil and solvent, rendering the filter cakes unwashable with any degree of speed or completeness, and when the proposed dewaxing or deoiling temperature has been reached adding to the chilled gelatinous mass a good wax anti-solvent in an amount by volume equivalent to or greater than 1 part of anti-solvent per 1.5 parts of solvent. Upon adding these amounts of wax anti-solvent, which is precooled to about the filtering temperature, the gelatinous mass is apparently converted into a slurry consisting of well-defined wax crystals in a solution of oil in the mixture of solvents. This wax slurry is readily filterable, having a particularly high filtration rate and forming wax cakes on the filter which are relatively dense, non-porous and which do not crack so that the cakes are readily washed with solvent. The washed wax cakes retain extremely low proportions of oil and solvent and, after elimination of solvent by evaporation, are found to consist of substantially pure wax free from solvent and containing extremely low proportions of oil, such as below 0.5 to 1% of oil. Apparently the wax separated in this manner does not retain or absorb appreciable amounts of solvent.

Furthermore, it has been discovered that when chilling a wax-oil mixture in the presence of an aromatic solvent which produces the gelatinous unfilterable wax the rate of chilling may be varied over wide limits without affecting the filter rate of the wax slurry produced after mixing with wax anti-solvent and without affecting the washing of the wax cake on the filter. Thus, although in conventional processes chilling rates of 1° F. to 3° F. per minute must be closely adhered to in order to produce a filterable wax, in the present process chilling rates as high as 10° F. to 15° F. per minute have been employed without deleteriously affecting the filtration characteristics of the resultant wax-oil-solvent mixture after mixing with a wax anti-solvent. In fact, rapid chilling appears to improve filtration characteristics in most cases.

A fundamental discovery is, therefore, that gelatinous unfilterable or poorly filterable wax may be converted into a crystalline, readily filterable form, without altering the temperature, by adding to the gelatinous wax one of the wax anti-solvents described herein. The gelatinous wax may contain, or be associated with, a low boiling solvent and/or mineral oil. The structure of the wax which separates on chilling a mixture of oil, wax and a solvent such as benzene, toluene and the like has been described as gelatinous. Although the exact physical form of the wax is not known, it is observed that when such a mixture is chilled, with or without agitation, the whole mass assumes a gelatinous form as a temperature is reached where wax becomes insoluble in the mixture of solvent and oil with which it was originally associated. Microscopic examination of chilled mixtures of wax, oil and toluene as well as microscopic examination while such mixtures are being chilled, using a magnification of 100 diameters and using polarized light in order to show more distinctly the separation of waxy masses, has failed to indicate the presence of wax crystals even at temperatures as low as 0° F. It is assumed from this and from the description above given, that on cooling such mixtures a gelatinous product is formed and it is believed that this is a reasonable interpretation of the phenomenon which occurs.

On adding a wax anti-solvent such as methyl ethyl ketone, in amounts greater than about 1 part of anti-solvent to 1.5 parts of solvent by volume, to a gelatinous mass obtained by chilling, a mixture of wax, oil and solvent (toluene for example) there is produced a slurry which is readily fluid and apparently consists of crystalline wax suspended in the solvent solution of oil. This again has been verified by microscopic examination under the same magnification referred to above using polarized light for illumination of the specimens under examination. This slurry appears to contain crystalline wax masses, which masses are of uniform size and apparently not interlaced and are thus free to move in the liquid phase. Additionally, microscopic examination has been made of the crystal formation and growth on adding a wax anti-solvent to a gelatinous mass produced by chilling a mixture of wax, oil and solvent such as toluene. In this case, although no crystals are observable in the original chilled mixture at 0° F., on adding wax anti-solvent, precooled to the same temperature, it is observed that crystal formation and growth is uniform and extremely rapid.

For comparison, microscopic examination of a chilled wax slurry prepared by chilling a wax-oil mixture in the presence of toluene and methyl ethyl ketone showed the presence of crystalline wax masses which appeared to be interlaced with other wax masses in such a manner that there appeared to be no regularity or uniformity in the size of the wax masses.

Thus, it is an object of the invention to separate wax-oil mixtures into their constituent components in a simple, efficient and economical manner.

It is a further object of the invention to separate wax-oil mixtures into substantially oil-free wax and oil of low pour test.

Another object of the invention resides in dewaxing or deoiling wax-oil mixtures in the presence of solvents of the non-viscous type and separating wax from a solvent mixture in such a manner that the wax is in a readily filterable, readily washable and substantially oil-free condition.

Another object of the invention is to convert gelatinous, unfilterable or poorly filterable wax into a non-gelatinous readily filterable form at substantially the same temperature by contacting or admixing the gelatinous wax with a wax anti-solvent.

Another object of the invention is to provide a method of wax-oil separation involving chilling of the wax-oil mixtures followed by filtration which permits the use of rapid chilling rates.

Still another object of the invention is to provide a method of deoiling waxes and dewaxing oils which involves chilling wax-oil mixtures in the presence of a diluent but which permits exceptionally rapid filtration and washing rates, thus permitting a substantial reduction in the filtration cycle time in commercial operations, the method comprising chilling the wax-oil mixture in the presence of an aromatic hydrocarbon solvent to produce a gelatinous mass and adding to the chilled mass an amount by volume of a wax anti-solvent equal to at least 1 part per 1.5 parts of aromatic hydrocarbon solvent to prepare the chilled mass for filtration.

Other objects and features of the invention will be apparent from the following description of the invention.

In the following description of the invention the term "solvent A" will be employed to designate the aromatic hydrocarbon solvent which is added to the wax-oil mixture before chilling and "solvent B" will be employed to designate the wax anti-solvent which is added to the chilled wax-oil solvent A mixture to convert the gelatinous wax precipitate in a readily filterable crystalline form.

Solvents which may be employed as solvent A and used during the chilling of the wax-oil solvent mixture according to this invention are those which will cause the separation of the described gelatinous wax. These include the aromatic hydrocarbons benzene, toluene, mixtures of benzene and toluene, xylene, and even somewhat higher molecular weight benzene homologs such as cumene. Also mixtures of low molecular weight aromatic compounds or hydrocarbon fractions containing appreciable proportions of aromatic hydrocarbons may be employed. Of these solvents benzene, benzene containing sufficient toluene to prevent solidification at the lower dewaxing temperatures, and toluene are the preferred solvents. Benzene cannot be efficiently used by itself for dewaxing where the dewaxing temperature is in the range of 0 to —25° F. because of its relatively high solidification point. However, a mixture of 90% benzene and 10% toluene may be employed for such low temperature dewaxing operations.

Solvents which may be employed as solvent B, and are added to the chilled mixture of wax, oil and solvent A to convert the separated unfilterable or poorly filterable wax into the desired easily filterable form include the wax anti-solvents, or poor wax solvents, acetone, methyl ethyl ketone (MEK), methyl propyl ketone, methyl isopropyl ketone, methyl normal butyl ketone, methyl isobutyl ketone as well as higher ketones containing up to about 8 carbon atoms and mixtures of such ketones; propyl alcohol, butyl alcohol, amyl alcohol and mixtures of such alcohols; ethylene dichloride, trichlorethylene; various ethers such as diethyl ether, ethyl isopropyl ether and the like. Of these solvents, the ketones are preferred and MEK is the particularly preferred solvent B.

According to the invention, separation of wax from wax-oil mixtures is effected by chilling the wax-oil mixture to the desired dewaxing or deoiling temperature in the presence of solvent A which causes the separation of wax from oil in a gelatinous condition, which wax cannot be separated successfully from oil by filtration, and subsequently adding to the chilled mixture a precooled wax antisolvent (solvent B) which has the effect of converting the gelatinous wax into a physical form which is readily filterable. The amount by volume of solvent B apparently must be at least about 1 part per 1.5 parts of solvent A. In other words the ratio of solvent B to solvent A in the final mixture to be filtered must be at least about 0.67 to 1. Lower ratios are apparently unsatisfactory in that they do not improve filtration rate, in fact it has been observed that using ratios of solvent B to solvent A in the range between 0.1 to 1 and 0.5 or 0.6 to 1 filtration rates are lower than those obtained in conventional dewaxing operations where the wax-oil mixtures are chilled in the presence of wax anti-solvents. Apparently using the smaller ratios of solvent B the conversion of the gelatinous wax into a readily filterable form does not occur.

The temperature to which the wax-oil-solvent A mixture is cooled will depend upon the grade of wax which it is desired to separate, and upon whether or not a low pour point oil is to be produced. Thus, if it is desired to separate a high melting wax from a wax-oil mixture this mixture will be cooled in the presence of solvent A to a temperature between about 75° F. and 25° F., and the required quantity of solvent B, precooled to about the same temperature, will be added and mixed with the chilled mixture in order to effect the desired change in the structure of the separated wax. The resulting mixture will then be filtered to separate the oil-free wax from the resulting mixture of solvent A, solvent B and oil still containing low melting point wax. The wax cake is preferably washed on the filter at about the same temperature with a small amount of solvent which is preferably a mixture of solvent A and B, of the same composition as is present in the filtrate. High melting point waxes separated in this manner have been found to contain less than 0.5–1.0% of oil and are light in color. Water-white marketable products may be obtained by simple treatment with filter clay at 250° F.–350° F. Such waxes have melting points in the range of 130° F. to 200° F. depending upon the particular wax-oil mixture being treated and upon the dewaxing temperature employed.

If it is desired to recover the low melting point wax from the filtrate obtained in the above operation, and to produce a low pour test oil, the filtrate consisting of solvent A, solvent B, low melting point wax and oil is further chilled to a temperature in the range of 10° F. to —25° F. and the chilled mixture is found to be readily filterable, producing a wax cake of low melting point wax, i. e. melting within the range of 90° F. to 125° F., or possibly 130° F., which is readily washed on the filter and is obtained substantially oil-free. Thus, after separating the high melting point wax in the manner described the low melting point wax may be separated successfully by conventional methods, i. e., cooling in the presence of a solvent having wax anti-solvent characteristics, to produce a readily filterable wax reject.

If it is desired to separate substantially all of the wax from a wax-oil mixture in one step this can be done by cooling the mixture of wax, oil and solvent A to a temperature of 10° F. to —25° F. and adding precooled solvent B at about the same temperature as the chilled mixture, mixing to effect the conversion of separated wax into the readily filterable form and filtering. In such cases it is found that the wax, after washing and evaporating to remove solvent, is substantially oil-free. Moreover, the filtrate consisting of oil and mixed solvent, after evaporating to remove the solvent, is low pour point, substantially completely dewaxed oil.

In its broadest aspects, the invention comprises converting gelatinous, unfilterable or poorly filterable wax into a readily filterable, physical form without materially changing the temperature of the system by adding to the gelatinous wax, or contacting the gelatinous wax with a sufficient quantity of solvent B, as for example methyl ethyl ketone, which has the effect of converting the unfilterable wax into a physical form which permits easy removal of the wax from any liquid phase present by simple filtration.

The method of separation of wax-oil mixtures according to the invention may better be understood by reference to the drawing, which is a diagrammatic view of a system suitable for carrying out the process. Referring to the drawing, a waxy stock, for example a raffinate derived by selective solvent extraction of an S. A. E. 50 waxy distillate produced by the vacuum distillation of a Santa Fe Springs crude oil or the raw distillate itself, or other raw distillates or raffinates obtained from waxy crude oils, or the crude waxes or slack waxes obtained from such oil, or even a crude oil residue containing wax, is maintained in tank 10 at a temperature sufficiently high to maintain the wax in solution in the oil. The solution of wax in oil is withdrawn from its storage tank through line 11 controlled by valve 12 and is pumped by means of pump 13 into chilling and mixing column 14. Column 14 is provided with a jacket 15 into which a cooling liquid may be introduced by means of line 16 and withdrawn through line 17. Column 14 is also provided with agitating or stirring paddles and scrapers 18 on shaft 19 which is rotated by pulley 20 connected to a suitable source of power not shown. Solvent A, for example toluene, xylene, or a mixture of benzene and toluene, maintained in tank 21 is withdrawn from tank 21 through line 22 controlled by valve 23 and pumped by means of pump 24 into chilling and mixing column 14. The mixture of wax, oil and solvent A is chilled, with sufficient agitation to prevent the mixture setting up into a solid or non-fluid mass, to the desired dewaxing temperature.

When the desired temperature for dewaxing has been reached the chilled mixture is withdrawn from column 14 through line 25 controlled by valve 26 and pumped by means of pump 27 through line 28. At the same time solvent B, which is a wax anti-solvent, as for example methyl ethyl ketone, a mixture of methyl ethyl ketone and acetone, methyl propyl ketone, methyl isopropyl ketone or methyl isobutyl ketone is withdrawn from tank 29 through line 30 controlled by valve 31 and pumped by means of pump 32 through cooler 33 where it is cooled to about the temperature of the chilled wax-oil-solvent A mixture and passed by means of line 34 into line 28 in contact with the cooled wax-oil mixture from column 14. The combined stream is passed through mixer 35 and line 35a into filter 36 where the wax suspended in the mixture is separated from oil and mixed solvent. Mixer 35 may be a baffled pipe or even a short length of ordinary piping may suffice as a mixing means. The wax separated in filter 36 is withdrawn via line 37, controlled by valve 38, and pumped by means of pump 39 through heat exchanger 40 where it is heated sufficiently to effect vaporization of any solvent remaining in the wax. The heated wax is then passed via line 41 into evaporater 42 which is provided with closed heating coil 43 and mist extractor 44. The solvent vapors are recovered from the evaporator via line 45 controlled by valve 46 through line 47, condenser 48, line 49 controlled by valve 50 and pumped through line 51 by means of pump 52 into mixed solvent storage tank 53. The solvent-free wax is withdrawn from evaporator 42 through line 54, controlled by valve 55, and pumped by means of pump 56 into storage tank 57.

Prior to the removal of the wax cake deposited on the filtering element of filter 36 it is preferable to wash the wax cake with a small amount of mixed solvent which may be withdrawn from storage tank 53 through line 58 controlled by valve 59 and forced by pump 60 through line 61 controlled by valve 62 through cooler 63 where the mixed solvent is cooled to the dewaxing temperature. The cooled solvent leaving cooler 63 passes through line 64 controlled by valve 65 and line 35a to filter 36. The solvent containing the washed constituents of the filter cake is passed from filter 36 into line 66 and is further handled in the manner described for the filtrate consisting of dewaxed oil and mixed solvent in the following paragraph.

The filtrate is passed from filter 36 through line 66, controlled by valve 67 into heat exchanger 68 where it is heated sufficiently to effect vaporization of the solvent. The heated filtrate is then passed via line 69 into evaporator 70 which is provided with closed heating coils 71 and mist extractor 72 in which the solvent is vaporized from the oil. The solvent-free dewaxed oil is removed from the bottom of the evaporator through line 72 controlled by valve 73 and pumped by pump 74 to dewaxed oil storage tank 75. The vaporized solvent is removed from evaporator 70 through line 76 controlled by valve 77 and passed via line 47 to condenser 48 and thence to mixed solvent storage tank 53 in the manner described for the solvent vaporized from evaporator 42.

The mixed solvent, consisting of a mixture of solvent A and solvent B in storage tank 53, is separated into its components for further use in the wax-oil separation process by pumping the mixed solvent from tank 53 by means of pump 60 through line 58 controlled by valves 59 and 78 into distillation column 79. This distillation column may be a plate type column or a packed column such as is indicated in the drawing. The packing shown as 80 may be any conventional type of packing such as ceramic rings, saddles, or broken ceramic fragments or the like. In the distillation column, solvent B, as for example methyl ethyl ketone, is vaporized and passed through line 81 controlled by valve 82 through condenser 83 and pumped by means of pump 84 through line 85 controlled by valve 86 into line 87 controlled by valve 88 into solvent B storage tank 29. The solvent A, as for example toluene, which is obtained as a bottoms fraction in distillation column 79 is passed through line 89 controlled by valve 90 through cooler 91 and pumped by means of pump 92 through line 93 controlled by valve 94 and thence through line 95 into solvent A storage tank 21.

The above description of the invention is confined to a case in which a single wax fraction is desired, the single wax fraction constituting either substantially all of the wax present in the wax-oil mixture or merely the high melting point wax present in the mixture. However, the process of this invention is applicable to the removal of two separate wax fractions, one consisting primarily of the high melting point wax originally present in the mixture and the second consisting of the low melting point wax present in the mixture. When such a separation is desired complete dewaxing is not effected in the first stage, i. e., the stage described above, but rather in this stage the wax-oil-solvent A mixture is chilled to a temperature sufficient to reject from solution only the high melting point wax and the low melting point wax is removed in a second stage. In this method of operation the mixture of oily wax and solvent A is chilled to a temperature between 75° F. and 25° F. Solvent B is added and mixed in the manner previously described to convert the separated wax into readily filterable form and the mixture is filtered to separate the high melting point wax from the mixture of oil, low melting point wax and solvents. After washing, the high melting point wax is removed from the filter 36 and passed through a solvent recovery stage as indicated. The filtrate from filter 36, consisting of oil and low melting point wax in solution in a mixture of solvent A and solvent B is passed through line 66 and removed from this line through line 96 controlled by valve 97 and passed into chilling and mixing column 98. This column may be similar to column 14 used in the first dewaxing stage. In column 98 the oil-wax-solvent mixture is cooled to the desired dewaxing temperature which may be as low as 10° F. to −25° F. or −30° F. to cause further separation of wax. The wax separating at this stage is of relatively lower melting point than the wax removed in the initial stage. The chilled mixture is passed via line 99, controlled by valve 100, and pumped by pump 101 through line 101a into filter 102, from which the separated low melting point wax containing some solvent is removed via line 103 controlled by valve 104 and pumped by means of pump 105 through heat exchanger 105a and into evaporator 106. Evaporator 106 is similar to previously described evaporator 42 and is heated by means of closed steam coil 107 and contains mist extractor 108. Low melting point wax is removed from evaporator 106 through line 109 controlled by valve 110 and pumped by means of pump 111 into low melting point wax storage tank 112. The solvent vaporized in evaporator 106 is passed via line 113 controlled by valve 114 into line 115 and through condenser 116 and line 117 controlled by valve 118 into line 51 and pumped by pump 52 to mixed solvent storage tank 53. The filtrate from filter 102 consisting of substantially completely dewaxed oil and mixed solvent is passed through line 119 and heat exchanger 120 into evaporator 121, which is similar to previously described evaporators 42 and 106, wherein the solvent is vaporized from the dewaxed oil. Dewaxed oil is removed from evaporator 121 through line 122 controlled by valve 123 and pumped by means of pump 124 into dewaxed oil storage tank 125. The mixed solvent vaporized from the dewaxed oil is removed from evaporator 121 through line 126 controlled by valve 127 and passed into line 115 and thence to mixed solvent storage tank 53 as described for the solvent vaporized from evaporator 106.

It is generally desirable to wash the wax cake on the filter with mixed solvent, the solvent being at substantially the filtering temperature of the wax-oil-solvent mixture. Mixed solvent can be obtained from line 117, or by means of connections not shown from storage tank 53, and passed through line 128 controlled by valve 129 through cooler 130 and thence through line 131 controlled by valve 132 and line 101a into filter 102. The washings are passed from filter 102 into line 119 and handled in the manner described for the filtrate removed from this filter.

A modification of the solvent recovery process is necessitated if solvent A cannot be separated from solvent B by simple distillation due to azeotrope formation. Thus, if benzene or a mixture of benzene and toluene is employed as solvent A with methyl ethyl ketone as solvent B separation cannot be readily effected by simple distillation due to azeotrope formation between the benzene and methyl ethyl ketone. In this case the mixed solvents obtained from the first stage through line 49 controlled by valve 50 or obtained from the second stage through line 117 controlled by valve 118 are passed through line 133 controlled by valve 134 and pumped by means of pump 135 into extractive distillation column 136. Column 136 may be a plate type column or may be a packed column as indicated for distillation column 79, packing being represented by 137. Heat is supplied to this column by closed steam coil 138. The solvent mixture enters at a point near the bottom of the column and passes upward through the column countercurrent to the flow of an extractive solvent such as ethylene glycol, diethylene glycol and the like, which solvent boils at least 20° F. and preferably 50° F. above the boiling point of any component of solvent A and has a greater affinity for solvent B than for solvent A. The extractive solvent is passed from storage tank 139 through line 140 controlled by valve 141 and pumped by means of pump 142 into extractive distillation column 136 at a point near the top of the column. The temperature within the column is maintained at such a point that solvent A is vaporized and removed as vapor from the top of the column and solvent B, dissolved in the extractive solvent, is removed from the bottom of the column. Vaporized solvent A is removed from the column through line 143 controlled by valve 144, passed through condenser 145 and pumped by means of pump 146 through line 147 controlled by valve 148 into line 95 and thence into solvent A storage tank 21.

The extractive solvent solution of solvent B is removed from the bottom of column 136 via line 149 controlled by valve 150 and pumped by pump 151 into distillation column 152. Distillation column 152 is similar to distillation column 79. In this column solvent B is vaporized and the extractive solvent is removed as bottoms through line 153, controlled by valve 154, and pumped by means of pump 155 via line 156 into extractive solvent storage tank 139. Vaporized solvent B is removed from the top of distillation column 152 via line 157 controlled by valve 158 and passed through condenser 159 from which it is pumped by means of pump 160 through line 161 controlled by valve 162 and passed via line 87 controlled by valve 88 into solvent B storage tank 29.

The rate of chilling of the wax-oil-solvent A mixture in chiller 14 may be varied within wide limits without affecting the filterability of the resultant wax. Chilling rates between 0.5° F. and 20° F., or even higher, may be employed. Even shock chilling of the mixture of wax, oil and solvent A will result in the separation of a gelatinous wax which is converted into a readily filterable wax upon addition of solvent B.

When separating wax-oil mixtures containing high proportions of wax and relatively low proportions of oil such as, for example, crude waxes or slack waxes, it is often desirable to dilute the chilled mixture of wax, oil, solvent A and solvent B before filtering with a portion of the filtrate obtained in the filtering operation. In order to effect this dilution, filtrate is returned from line 66 to line 35a through line 163 controlled by valves 164 and 165, by means of pump 166. The amount of filtrate returned in this manner may be as high as about 2 or 3 volumes per volume of original wax-oil mixture, although generally about 1 volume of the filtrate is so returned.

The amounts of solvent, as well as the proportions of solvent A and solvent B in the solvent mixture, will depend upon the character of the wax-oil mixture to be separated and particularly upon the viscosity and/or viscosity index of the oil present in the wax-oil mixture. In general, the total amount of solvent including both solvent A and solvent B will not be greater than about 10 volumes, and probably not less than about 0.5 volume per volume of wax-oil mixture. Usually the amount of solvent will be between about 1.5 and 6 volumes per volume of wax-oil mixture. However, it is essential that the solvent solution of oil in the chilled mixture be sufficiently non-viscous that filtration may be readily effected. The larger proportions of solvent will be employed in dewaxing those wax-oil mixtures containing relatively low percentages of wax, and in which the oil is of high viscosity index and/or viscosity. Thus, as much as 8 or 10 volumes of total solvent per volume of wax-oil mixture may be employed in dewaxing viscous lubricating oil raffinates. In dewaxing distillates and raffinates generally between about 2 volumes and about 6 or 7 volumes of total solvent per volume of the distillate or raffinate will be employed. The lower solvent ratios are generally employed in the separation of wax-oil mixtures generally referred to as crude or slack wax and the like. Such separations may be considered as deoiling processes because the primary object is to obtain an oil-free wax. In such deoiling operations, between about 0.5 and 5 or 6 volumes of solvent per volume of crude wax may be employed although 1½ to 4 volumes of solvent are usually employed.

The volume ratio of solvent B to solvent A must be less than 10 to 1 and greater than about 0.67 to 1. Smaller proportions of solvent B are insufficient to effectively convert the gelatinous mass into a readily filterable form which will produce an easily washable filter cake. Preferably the ratio will be in the range of about 7.5 to 1 and 0.9 to 1. Equal proportions by volume of solvent A and B, i. e. a ratio of 1 to 1, have been found to be particularly effective in separating a wide variety of wax-oil mixtures. The ratio which is most effective for any given separation will depend upon the viscosity and the viscosity index of the oil associated with the wax in the wax-oil mixture to be separated. The lower ratios of solvent B indicated above will be employed to separate those mixtures containing high V. I. and/or high viscosity oil. Moreover, the temperature of dewaxing or deoiling will also influence the ratio to be employed. In general, the lower the dewaxing or deoiling temperature the lower will be the ratio of solvent B to solvent A in the mixture of solvents employed. The higher ratios of solvent B to solvent A indicated will be employed in the treatment of wax-oil mixtures containing oil of relatively low viscosity and/or low viscosity index. Thus, low viscosity distillates will require a higher ratio of solvent B to solvent A than the high viscosity distillates or than the raffinates from the low or high viscosity distillates. The higher ratios are also employed generally in de-oiling crude waxes and the like. In selecting the particular ratio of solvent B to solvent A for any given separation, it is desirable that sufficient solvent A be added so that the wax separating on chilling will be of the gelatinous type and that on the addition of solvent B, at dewaxing or deoiling temperatures, the resulting product consists of a rejected, easily filterable crystalline wax suspended in an oil-solvent mixture consisting of a single liquid phase. If the proportion of solvent A is too low there may be two liquid phases present in the chilled mixture; one consisting of oil containing a small amount of solvent, and the other consisting of solvent containing relatively small amounts of oil. This condition is to be avoided.

In the description of the invention it has been stated that solvent A is added to the mixture of wax and oil at a temperature such that the wax is in solution, or miscible, with the oil and the resulting mixture cooled to the dewaxing or deoiling temperature. It is to be understood, however, that if a portion of the solvent A to be employed is added while the wax is completely in solution in the oil the remainder may be added in increments during the chilling of the wax-oil mixture. The rate of addition of solvent A must be sufficient to cause the wax which separates to be of the gelatinous type. If insufficient solvent A is present during the chilling, wax separates out in poorly defined crystal masses which seriously reduce filter rates of the resulting products. It is essential in carrying out the process of this invention that substantially no crystal formation occurs during the chilling. Thus, in carrying out the process of the invention a mixture of wax and oil may be mixed with, for example, 10% or more of the total amount of solvent A to be employed, and as the mixture is chilled, further increments of solvent A may be added. All of the solvent A should be added by the time the temperature of the wax-oil-solvent mixture reaches the desired dewaxing or deoiling temperature. At this temperature, precooled solvent B is added to produce the filterable wax. In some instances improved filtration rates have been observed when the chilling of the wax-oil mixture has been carried out with incremental addition of solvent A.

Furthermore, it is within the scope of the invention to treat wax, particularly petroleum wax, which is present at any given temperature as a gelatinous type wax containing or being associated with solvent with or without oil, to convert this gelatinous type wax into a readily filterable physical form, regardless of how such gelatinous wax is produced.

In the description of the process of this invention it has been assumed that solvent A and solvent B are completely separated after use for reuse in the process. While it is desirable and, in fact, preferred that pure solvent A be returned in the process as indicated and pure solvent B be added at the dewaxing temperature, the solvent A which is added to the wax-oil mixture before chilling may contain small amounts of solvent B providing the amounts of solvent B are insufficient to prevent the formation of the gelatinous, unfilterable waxy reject on cooling. Moreover, solvent B may contain small proportions of solvent A providing that it contains a sufficient amount of solvent B or at least has sufficient wax anti-solvent characteristics to cause the change in structure from the unfilterable to the readily filterable form. For these reasons it is not essential that complete separation of solvent A from solvent B be effected in the recovery stage. It has been found, for example, that solvent A containing a few per cent to as much as about 10% by volume of solvent B in some instances produces the described unfilterable wax during the initial chilling. Moreover, it has been found that solvent B containing a few per cent to as much as 10% by volume of solvent A may be added to the chilled mixture to effect the desired conversion of the unfilterable wax into readily filterable, crystalline form.

The amount of solvent employed for washing the wax cake on the filter is generally about 1 volume of the mixed solvent, using the substantially same ratio of solvent A to solvent B as is present in the filtrate, per volume of the original wax-oil mixture, although as much as 3 to 4 volumes of the mixed solvent may be employed and in some cases as little as 0.25 to 0.5 volume of the solvent may suffice. The object of washing is to remove oil retained in the wax cake after filtering so that the amount of solvent employed for washing will depend to a certain extent on the ease of washing and upon the quality of wax desired. Wax cakes formed by the process of this invention are found to be readily washed with between about 0.5 volume and 1 volume of solvent to produce substantially oil-free wax cake.

Dewaxing aids of various sorts are employed in many dewaxing operations and they may be used in the process of this invention with beneficial results. It is to be pointed out that such aids are apparently not necessary in that readily filterable waxes have been produced from substantially all types of wax-oil mixtures without their use. In certain cases dewaxing aids such as oxidized waxes, particularly oxidized petroleum waxes, asphaltic materials, polyvalent metal soaps of fatty acids such as aluminum stearate and the like may improve filtering and washing rates. These materials may be added to the wax-oil mixtures before chilling.

The following examples will further illustrate the invention.

*Example I*

A sample of an SAE 40 waxy furfural reffinate from a Mid-Continent crude oil was treated following the process of this invention and, for comparison, following conventional dewaxing methods for the separation of high melting point wax.

In the first case to 50 grams of the waxy raffinate, heated to 150° F. to effect solution of all of the wax in the oil, was added 75 ml. of a mixture of 90% benzene and 10% toluene, and the resulting mixture chilled, at the rate of about 1.5° F. per minute, with stirring to 35° F. To the chilled mixture was added 75 ml. of MEK precooled to 35° F. and the resulting mixture filtered through an 11 cm. Buchner funnel. The wax cake was washed with 75 ml. of a mixture of 50% MEK, 45% benzene and 5% toluene precooled to 35° F.

A second 50-gram portion of the waxy raffinate was heated to 150° F. in the presence of 75 ml. of a mixture of 50% MEK, 45% benzene and 5% toluene, the mixture chilled at the same rate with stirring to 35° F. and mixed with an additional 75 ml. portion of solvent of the composition initially employed precooled to 35° F. The resulting slurry was filtered in the same manner as above and the wax cake washed on the filter with a third 75 ml. portion of the mixed solvent also precooled to the filtering temperature.

The results of the above experiments are presented in the following table:

|  | Chilling in presence of solvent A; then adding solvent B | Conventional dewaxing |
|---|---|---|
| Yield of wax, percent by weight | 8.6 | 7.6 |
| Melting point of wax, ° F | 159.5 | 161 |
| Filter time, minutes | 0.50 | 1.00 |
| Washing time, minutes | 1.30 | 2.50 |

*Example II*

Example I was repeated, using an SAE 70 waxy furfural raffiate from Mid-Continent crude oil. The data are presented in the following table:

|  | Chilling in presence of solvent A; then adding solvent B | Conventional dewaxing |
|---|---|---|
| Yield of wax, percent by weight | 5.8 | 5.6 |
| Melting point of wax, ° F | 170 | 170 |
| Filter time, minutes | 1.20 | 2.30 |
| Washing time, minutes | 2.20 | 3.00 |

*Example III*

A sample of an SAE 20 raffinate from Mid-Continent crude was dewaxed under conditions designed to produce a substantially oil-free wax directly from the raffinate. The dewaxing was carried out according to the process of the invention and by conventional means for comparison. In the first case 50 g. of the waxy raffinate was diluted with 50 ml. of toluene, the mixture heated to 150° F. and chilled to 35° F. at a rate of about 1.5° F. per minute. To the chilled mixture was added 50 ml. of MEK precooled to 35° F. The resulting slurry was filtered and washed on the filter with 75 ml. of equal parts of toluene and MEK.

A 50 g. portion of the same waxy raffinate was heated to 150° F. and chilled to 35° F. with incremental addition of solvent consisting of equal parts of toluene and MEK. A total of 100 ml. of the mixed solvent was added by the time the temperature of the mass was 50° F. The resulting slurry was filtered and washed on the filter with 75 ml. of the same mixed solvent.

Data regarding the yields and filter times for the two methods of dewaxing are shown in the following table:

|  | Chilling in presence of solvent A; then adding solvent B | Conventional dewaxing |
|---|---|---|
| Yield of wax, percent by weight | 8.8 | 9.0 |
| Melting point, ° F | 147 | 148 |
| Filter time, minutes | 0.75 | 1.42 |
| Washing time, minutes | 1.12 | 1.67 |

*Example IV*

A portion of the waxy raffinate employed in Example III above was dewaxed under conditions designed to produce a low pour point oil using the process of this invention, and, for comparison, a conventional dewaxing process. In the first case 50 g. of the waxy raffinate was diluted with 75 ml. of toluene and heated to 150° F. The resulting mixture was chilled to 0° F. and 75 ml. of MEK precooled to 0° F. was added and mixed with the chilled mixture. The resulting slurry was filtered and the wax cake washed on the filter with 75 ml. of precooled solvent consisting of equal parts of toluene and MEK.

A second 50 g. portion of the waxy raffinate was mixed with 75 ml. of toluene and 75 ml. of MEK. The mixture was chilled to 0° F. and filtered. The wax cake was washed on the filter with 75 ml. of equal parts of toluene and MEK precooled to the filtering temperature.

A third 50 g. portion of the waxy raffinate was heated to 150° F. and chilled to 0° F. During the chilling 150 ml. of equal parts of toluene and MEK was added; 50 ml. at 70° F., 50 ml. at 50° F. and 50 ml. at 20° F. The resulting slurry was filtered and the wax cake washed on the filter with 75 ml. of the same mixed solvent precooled to 0° F.

The results of the three above experiments are shown in the following table:

|  | Chilling in presence of solvent A; then adding solvent B | Conventional dewaxing | Conventional incremental addition |
|---|---|---|---|
| Yield of wax, percent by weight | 12.6 | 12.8 | 12.8 |
| Melting point, °F | 140.5 | 140.5 | 140.0 |
| Filter time, minutes | 1.50 | 2.25 | 3.00 |
| Washing time, minutes | 2.24 | 2.5 | 2.5 |

*Example V*

Example III, repeated using in each method 50 g. of the waxy raffinate, 25 ml. of toluene and 75 ml. of MEK, gives results comparable to those shown in the table of Example III. Filtering times in the case of the conventional method are approximately double those obtained by following the method of this invention.

*Example VI*

Example IV, repeated using acetone in place of MEK in each instance, gives filter rates similar to those shown in the table of Example IV. Using the conventional deoiling process the filter rates are lower than when the crude wax is chilled in the presence of toluene alone and acetone added at the temperature of filtration.

*Example VII*

Example IV, repeated using isopropyl alcohol in place of MEK, gives filter times slightly greater than those obtained using MEK. However, chilling in the presence of toluene and adding precooled isopropyl alcohol at the temperature of filtration gives appreciably higher filtration rates than when following conventional dewaxing methods.

*Example VIII*

To determine the effect of cooling rates on filtration rates of the resulting wax-oil-solvent slurries three 50 g. portions of a waxy raffinate from a California waxy crude oil long residuum, which raffinate was prepared by selective solvent extraction using a mixture of propane and phenol, were each mixed with 100 ml. of toluene, heated to 150° F. and the resulting mixtures chilled to 0° F. using chilling rates of 10° F., 3° F. and 1° F. per minute respectively. At 0° F. 100 ml. of MEK precooled to 0° F. was added to each chilled mixture and the resulting slurries were filtered. The wax cakes were each washed on the filter with 100 ml. of a precooled mixture of equal parts of toluene and MEK.

For purposes of comparison a sample of the same waxy raffinate was dewaxed by conventional methods. A 50 g. portion was mixed with 100 ml. of a mixture of equal parts of toluene and MEK, heated to 150° F. and chilled to 0° F. using chilling rates of about 1.5° F. per minute. The chilled mixture was diluted with a second 100 ml. portion of the mixed solvent precooled to 0° F. and filtered. The wax cake was washed on the filter with 100 ml. of the mixed solvent precooled to the filtering temperature.

|  | Chilling in presence of solvent A; then adding solvent B | | | Conventional dewaxing |
|---|---|---|---|---|
| Cooling rate, °F. per minute | 10 | 3 | 1 | 1.5 |
| Yield of wax, percent by weight | 23.8 | 24.4 | 26.4 | 32.6 |
| Melting point, °F | 153 | 152 | 152 | 143 |
| Filter time, minutes | 1.10 | 1.20 | 1.45 | 3.0 |
| Washing time, minutes | 2.85 | 2.40 | 2.85 | 3.9 |

*Example IX*

A sample of crude wax (petrolatum) obtained by dewaxing a Mid-Continent bright stock was deoiled in the following manner. A mixture of 50 g. of the petrolatum and 75 ml. of toluene was heated to 150° F. and then chilled to 40° F., at which temperature 75 ml. of precooled MEK was added and the resulting mixture filtered, the wax cake being washed on the filter with 75 ml. of a mixture of equal parts of MEK and toluene precooled to the filtering temperature.

For comparison a second 50 g. portion of the petrolatum was mixed with 75 ml. of equal parts of toluene and MEK, heated to 150° F., chilled to 40° F., at which temperature 75 ml. of the same mixed solvent precooled to 40° F. was added, and the mixture filtered and washed on the filter with 75 ml. of the mixed solvent which had also been precooled.

A third 50 g. portion of the petrolatum was heated to 150° F. and chilled to 40° F. with incremental addition of a solvent consisting of equal parts of toluene and MEK. A total of 200 ml. of solvent was added during the chilling. The chilled mixture was filtered and washed on the filter with 75 ml. of the same mixed solvent precooled to 40° F.

The results of the three operations are shown in the following table:

|  | Chilling in presence of solvent A; then adding solvent B | Conventional dewaxing | Conventional incremental addition |
|---|---|---|---|
| Yield of wax, percent by weight | 56.4 | 50 | 48 |
| Melting point, °F | 164 | 165 | 165 |
| Filter time, minutes | 1.15 | 2.33 | 4.20 |
| Washing time, minutes | 3.13 | 3.80 | 5.26 |

*Example X*

A crude wax obtained by conventional dewaxing operations from an SAE 40 propane-phenol raffinate from waxy California crude was deoiled by the methods of this invention and, for comparison, by conventional methods. A 50 g. portion of the crude wax was diluted with 50 ml. of toluene, heated to 150° F. and chilled to 35° F. To the chilled mixture was added 50 ml. of precooled MEK and the mixture filtered and washed with 75 ml. of solvent at the same temperature. The wash solvent consisted of equal parts of toluene and MEK.

A second 50 g. portion of the crude wax was mixed with 50 ml. of equal parts of toluene and MEK, heated to 150° F. and chilled to 35° F. Fifty ml. of the same mixed solvent precooled to 35° F. was added and the resulting mixture filtered, the wax cake being washed on the filter with 75 ml. of the mixed solvent at the same temperature. Data regarding these experiments are shown below:

|  | Chilling in presence of solvent A; then adding solvent B | Conventional deoiling |
|---|---|---|
| Yield of wax, percent by weight | 54.6 | 52.4 |
| Melting point, °F | 160 | 160 |
| Filter time, minutes | 0.80 | 1.75 |
| Washing time, minutes | 2.40 | 4.25 |

Example XI

Example X, repeated using 60 ml. of toluene and 40 ml. of MEK in place of equal parts of toluene and MEK, gives results substantially the same as those shown in the table of Example X.

Example XII

Example X, repeated using 70 ml. of toluene and 30 ml. of MEK in place of 50 ml. each of these solvents, gives filtration times of over 3 minutes for the sample chilled in the presence of toluene alone and 2 minutes for the sample chilled in the presence of mixed toluene-MEK, thus entirely losing the advantage of chilling in the presence of toluene alone.

Example XIII

An SAE 40 distillate from California waxy crude oil was dewaxed using proportions of solvent A to solvent B found to be desirable and, for comparison, using proportions of solvent B (waxy anti-solvent) below the limits found to be satisfactory. Using the low proportions of solvent B, this solvent was added before and after chilling to determine the effect of its presence during the chilling. In the following experiments the first two were carried out in accordance with the teaching of this invention using ratios of solvent B to solvent A of 1 to 1 but varying the ratio of total solvent to sample of distillate. In experiment (A) the latter ratio is 7 to 1 and in experiment (B) the ratio is 4 to 1. The second two experiments show the ineffectiveness of small amounts of solvent B. In experiment (C) using a ratio of total solvent to sample of about 3.82 to 1 and a ratio of solvent B to solvent A of about 0.097 to 1 the chilling was effected in the presence of solvent A and solvent B was added to the chilled mixture. The same solvent ratios were employed in experiment (D), however in this case chilling was effected in the presence of both solvent A and solvent B.

(A) A 50 g. sample of the above waxy distillate was diluted with 175 ml. of toluene, chilled to 0° F. and to the chilled mixture was added 175 ml. of MEK precooled to 0° F. The resulting slurry was filtered and the wax cake washed on the filter with 50 ml. of equal parts of toluene and MEK which had been precooled to the filtering temperature.

(B) A second 50 g. portion of the waxy distillate was dewaxed following the method outlined in (A) except that 100 ml. of toluene and 100 ml. of MEK was employed in place of the 175 ml. in each case.

(C) A third 50 ml. portion of the waxy distillate was diluted with 175 ml. of toluene, the mixture chilled to 0° F. and to the chilled mixture was added 17 ml. of MEK precooled to 0° F. and the resulting slurry filtered and washed on the filter with 50 ml. of solvent consisting of 89% toluene and 11% MEK precooled to 0° F.

(D) A fourth 50 g. portion of the waxy distillate was diluted with 175 ml. of toluene and 17 ml. of MEK. The resulting mixture heated to 150° F. and chilled to 0° F. The chilled mixture was filtered and the wax cake washed on the filter with 50 ml. of a mixture of 89% toluene and 11% MEK precooled to 0° F.

Data regarding the four above experiments are shown in the following table:

|  | Chilling in presence of solvent A; then adding solvent B | | Dewaxing using small proportions of solvent B | |
|---|---|---|---|---|
|  | (A) | (B) | (C) | (D) |
| Yield of wax, percent by weight | 12.2 | 12.1 | 9.4 | 10.4 |
| Melting point of wax, °F | 147 | 147 | 150.5 | 149 |
| Filter time, minutes | 1.5 | 0.9 | 3.38 | 2.23 |
| Washing time, minutes | 1.03 | 1.0 | 4.62 | 3.0 |

Example XIV

A sample of the waxy raffinate described in Example VIII was dewaxed using relatively low ratios of solvent B to solvent A in order to determine the effectiveness of these low ratios in producing filterable slurries in dewaxing operations applied to raffinates.

One 50 g. portion of the waxy raffinate was dewaxed following the method of experiment (C) of Example XIII and a second 50 g. portion was dewaxed as described in experiment (D) of the same example.

Data regarding these two operations are shown in the following table. Refer to the table in Example VIII for filtration rates on slurries produced from the same waxy raffinate by methods of this invention.

|  | Dewaxing using low MEK to toluene ratios | |
|---|---|---|
|  | Adding MEK to chilled mixture | Chilling in presence of mixed solvent |
| Yield of wax, percent by weight | 33.4 | 20.6 |
| Melting point, °F | 149 |  |
| Filter time, minutes | 19 | 19 |
| Washing time, minutes | 18 | 19 |

Example XV

A 50 g. sample of the waxy raffinate described in Example VIII was mixed with 100 ml. of toluene, heated to 150° F. and chilled to 0° F. An additional 100 ml. of toluene precooled to 0° F. was added and the resulting mixture allowed to stand for eight days in a cold chamber at 0° F. The gel originally formed remained stable over the period of eight days and exhibited no tendency to separate or bleed free oil.

Example XVI

Filtration studies to determine relative filtration rates of wax-oil-solvent slurries prepared according to the methods of this invention and those prepared by conventional processes have been carried out in pilot plant equipment such as is generally used to estimate filtration times in commercial rotary filter operations. In these tests, filter leaves having an area of 0.239 sq. ft.

and covered with a commercial filter cloth were employed. The filter leaves were completely immersed in the wax-oil-solvent slurry and a vacuum of 20 inches of mercury applied to the leaves until a cake of desirable thickness (about ¼ inch thick) was formed. The filter leaf was then removed from the slurry, allowed to dry for a few seconds, immersed in fresh solvent with the vacuum still being applied to the system and finally given a second drying period.

Total filtration rates including filtering, washing and drying were calculated in terms of pounds of wax per square foot of filtering surface per hour, and gallons of solvent-free filtrate per square foot of filtering surface per hour.

Wax slurries were prepared by the methods of this invention and by conventional methods for use in the above described filtration tests. One slurry was prepared by chilling 1500 g. (1715 ml.) of the waxy raffinate described in Example VIII in the presence of 3000 ml. of toluene to 0° F. and adding 3000 ml. of MEK precooled to 0° F. The second slurry was prepared by chilling 1000 g. (1143 ml.) of the same waxy raffinate and 2000 ml. of an equal volume mixture of MEK and toluene and adding a second 2000 ml. portion of the same mixed solvent precooled to 0° F. when the chilled mixture reached 0° F. The resulting slurries were found to have the following filtrate rates, and the wax and oil recovered in each case had the following characteristics:

| | Chilling in presence of solvent A; then adding solvent B | Conventional dewaxing |
|---|---|---|
| Filtration rate: | | |
| Lbs. of wax/sq. ft./hour | 10.3 | 2.11 |
| Gals. of solvent-free filtrate/sq. ft./hour | 2.45 | 0.399 |
| Yield of Wax, percent by weight | 36.2 | 41.2 |
| Melting point of wax, ° F | 143.5 | 143 |
| Yield of oil, percent by weight | 63.8 | 58.8 |

The foregoing description of my invention is not to be taken as limiting my invention but only as illustrative thereof since many variations may be made by those skilled in the art without departing from the scope of the following claims.

We claim:

1. A method of converting a normally crystalline petroleum wax which has been precipitated from an oil-aromatic solvent solution in an unfilterable gelatinous form into a readily filterable form, without changing the temperature, which comprises contacting the gelatinous wax with an amount by volume of a wax anti-solvent at least as great as about 1 part per 1.5 parts of aromatic solvent, said aromatic solvent consisting essentially of an aromatic hydrocarbon.

2. A method of converting an unfilterable gelatinous mixture of wax, oil and aromatic solvent consisting essentially of an aromatic hydrocarbon into a readily filterable slurry of wax in oil and solvent which comprises contacting said gelatinous mixture with an amount by volume of a wax-anti-solvent at least as great as 1 part to 1.5 parts of aromatic solvent.

3. A process for the separation of wax-oil mixtures which comprises chilling said wax-oil mixture in the presence of an aromatic solvent consisting essentially of an aromatic hydrocarbon to a temperature sufficient to cause the separation of wax in an unfilterable gelatinous form, adding to the chilled mixture a wax anti-solvent precooled to about the temperature of the chilled mixture and in the amount by volume of at least 1 part per 1.5 parts of aromatic solvent, and separating the resulting solvent solution of oil from wax.

4. A process as in claim 3 in which said aromatic solvent is toluene.

5. A process as in claim 3 in which said aromatic solvent comprises benzene.

6. A process as in claim 3 in which said wax anti-solvent is a ketone.

7. A process as in claim 3 in which said wax anti-solvent is MEK.

8. A process as in claim 3 in which said wax anti-solvent comprises acetone.

9. A process for the separation of wax from wax-oil mixtures which comprises chilling said wax-oil mixture in the presence of an aromatic solvent consisting essentially of an aromatic hydrocarbon to produce an unfilterable gelatinous mass, adding to the chilled mixture a wax anti-solvent precooled to about the temperature of said chilled mixture, the volume ratio of wax anti-solvent to aromatic solvent being at least 0.67 to 1, to convert said gelatinous mass into a readily filterable slurry of wax in a solvent solution of oil and separating said wax from said solvent solution of oil.

10. A process for the separation of wax-oil mixtures which comprises adding to said mixture an aromatic solvent consisting essentially of an aromatic hydrocarbon from which wax separates on cooling in a gelatinous non-filterable form, cooling the wax-oil-solvent solution to a temperature sufficient to cause the separation of at least a portion of the wax, adding a precooled wax anti-solvent at approximately the same temperature as the cooled wax-oil-solvent to convert the gelatinous wax present in the mixture into a readily filterable form and separating the resulting solvent solution of oil from said readily filterable wax, the amount by volume of wax anti-solvent added being at least as great as about 1 part per 1.5 parts of aromatic solvent.

11. A process for the separation of wax-oil mixtures which comprises bringing said mixture to a state wherein the wax is substantially completely dissolved in the oil present in said mixture, adding thereto an aromatic solvent consisting essentially of an aromatic hydrocarbon from which wax separates upon cooling in an unfilterable gelatinous form, chilling the wax-oil-solvent mixture to cause the separation of at least a portion of the wax present in said wax-oil mixture in a gelatinous form, adding to the chilled wax-oil-solvent mixture a precooled wax anti-solvent at substantially the same temperature as the wax-oil-solvent mixture to convert the gelatinous wax into a readily filterable form and separating the readily filterable wax from the oil-solvent mixture, the volume ratio of wax anti-solvent to aromatic solvent being between 0.67 and 10 to 1.

12. A process as in claim 11 in which said wax-oil-solvent mixture is chilled to a temperature between 75° F. and —25° F.

13. A process as in claim 11 in which the volume of wax anti-solvent to aromatic solvent is between 0.9 and 7.5 to 1 and the by volume ratio of total solvent to wax-oil mixture is between 0.5 and 10 to 1.

14. A process as in claim 11 in which the aromatic solvent is toluene and the wax anti-solvent is MEK.

15. A process for the separation of high melting point wax from a wax-oil mixture containing both high melting point and low melting point wax which comprises bringing said wax-oil mixture to a state wherein the wax present is substantially completely dissolved in the oil, adding to the wax-oil solution an aromatic solvent consisting essentially of an aromatic hydrocarbon from which wax separates on cooling in an unfilterable gelatinous form, cooling said solvent-wax-oil mixture to a temperature in the range of about 75° F. to about 25° F., adding to the chilled mixture a wax anti-solvent which has been precooled to substantially the same temperature as the chilled solvent-wax-oil mixture to convert gelatinous wax into wax of a readily filterable physical form and separating said readily filterable wax from the solvent solution of oil containing low melting point wax, the volume ratio of wax anti-solvent to aromatic solvent being between 0.67 and 10 to 1.

16. A process for the separation of high melting point wax and low melting point wax from wax-oil mixtures containing both high and low melting point waxes which comprises bringing said wax-oil mixture to a state wherein the wax present is substantially completely dissolved in the oil, adding thereto an aromatic solvent consisting essentially of an aromatic hydrocarbon, chilling the resulting mixture to a temperature between about 75° F. and 25° F. to cause the separation of high melting point wax in an unfilterable gelatinous non-crystalline form, adding to the chilled mixture a wax anti-solvent precooled to substantially the same temperature as said chilled solvent-wax-oil mixture to convert the separated wax into a readily filterable crystalline form, separating the readily filterable high melting point wax from a solution of low melting point wax, oil and solvent, further cooling the solvent-oil-low melting point wax mixture to a temperature between about 10° F. and about −25° F. to cause the precipitation of low melting point wax and separating low melting point wax from the solvent solution of substantially completely dewaxed oil, the volume ratio of wax anti-solvent to aromatic solvent being between 0.67 and 10 to 1.

17. A process according to claim 3 in which said wax anti-solvent comprises a ketone.

18. A process for the separation of wax from wax-oil mixtures which comprises adding to said wax-oil mixture an aromatic solvent consisting essentially of an aromatic hydrocarbon containing not more than 10% by volume of a wax anti-solvent, chilling the wax-oil solvent mixture to produce an unfilterable gelatinous mass, adding to the chilled gelatinous mass a wax anti-solvent containing not more than 10% by volume of aromatic solvent at substantially the same temperature as the chilled gelatinous mass to convert the gelatinous mass into a readily filterable slurry of wax crystals in a solvent solution of oil and separating said wax from said solvent solution of oil, the ratio of wax anti-solvent to aromatic solvent being at least as great as about 0.67 to 1.

P. STANLEY BACKLUND.
VANCE N. JENKINS.

REFERENCES CITED

The following references are of record in the file of this patent:

UNITED STATES PATENTS

| Number | Name | Date |
| --- | --- | --- |
| 2,049,059 | Goss et al. | July 28, 1936 |
| 2,067,050 | Govers | Jan. 5, 1937 |
| 2,223,939 | Jones | Dec. 3, 1940 |
| 2,229,658 | Jenkins | Jan. 28, 1941 |
| 2,463,845 | Backlund et al. | Mar. 8, 1949 |
| 2,486,014 | Evans | Oct. 25, 1949 |